Figure 1:
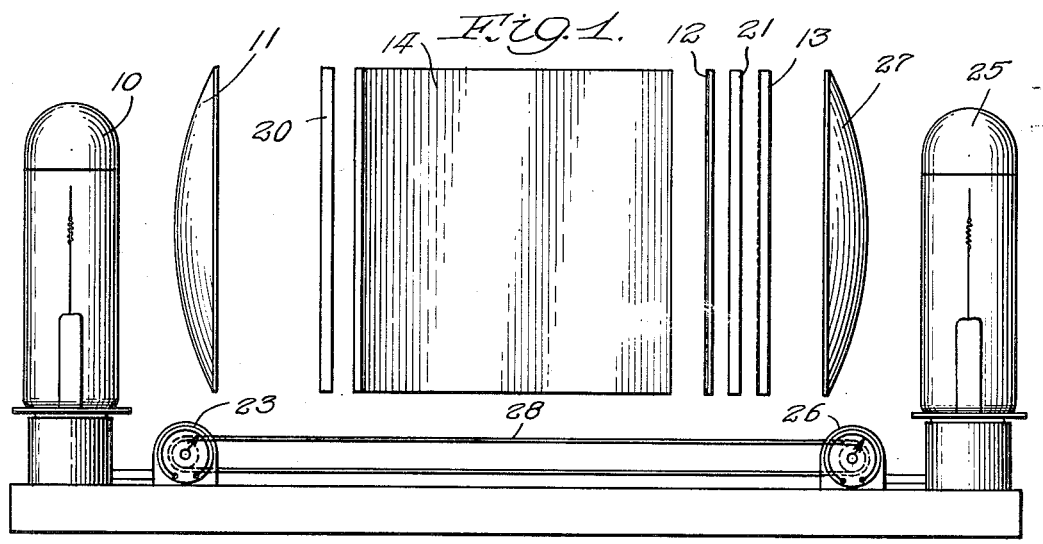

June 16, 1953  S. R. CARTER  2,641,963
METHOD AND APPARATUS FOR INCREASING
CONTRAST OF TRANSPARENCIES
Filed Nov. 16, 1950

Inventor:
Stanley R. Carter,
By Schroeder, Merriam,
Hofgren & Brady, Attys.

Patented June 16, 1953

2,641,963

UNITED STATES PATENT OFFICE 2,641,963

METHOD AND APPARATUS FOR INCREASING CONTRAST OF TRANSPARENCIES

Stanley R. Carter, Chicago, Ill.

Application November 16, 1950, Serial No. 196,025

6 Claims. (Cl. 88—24)

This invention relates to optical systems.

Considerable difficulty has been experienced in the past in providing means for increasing the contrast of transparencies, for example photographic negatives, positives and the like. Some of the more common methods employ a series of filters for projecting the transparency onto specially prepared photographic paper or other photosensitive medium while other systems contemplate the use of cathode ray tubes similar to television receivers. All of these systems are complex, expensive and often cumbersome.

It is often desirable to increase the contrast of transparencies particularly when projecting negatives on a photographic paper for producing portraits, pictures and the like. Thus in portrait work, a very soft printing paper may be used, and highlights and shadows, particularly shadow detail, are often lost because of the softness or lack of contrast of the photosensitive paper. It is also advantageous to increase the contrast in many X-rays, which are shadow graphs, in order to increase the details visible on the negative and to assist in a more accurate diagnosis or reading of the X-ray by a roentgenologist.

I have invented and am herein disclosing and claiming an optical system which is particularly adapted to increase the contrast of transparencies by a simple means which may be relatively inexpensively constructed and which may be used for increasing the contrast for photographic negatives which are to be reproduced as positives, and for increasing the contrast of negatives or other transparencies which are merely to be viewed. The principal feature of the optical system of this invention is the provision of means whereby the light which is viewed or projected is passed twice through the transparency so that the diminution of light by partially opaque portions of the transparency is doubled, thereby increasing the contrast of such areas. Inasmuch as one form of the invention contemplates directing parallel light upon the face of a transparency, it is clear that while most of the light will pass through the transparency some of it will be reflected from the face thereof and in order to eliminate reflections which decrease the accuracy of the system, the light is first polarized in one plane and then by passing it twice through a quarter wave plate the polarization of the light is rotated 90° and then passed through a polarizing filter. Inasmuch as the reflected light does not pass through the quarter wave plate, the polarizing filter effectively cuts out such reflected light.

Figure 2:
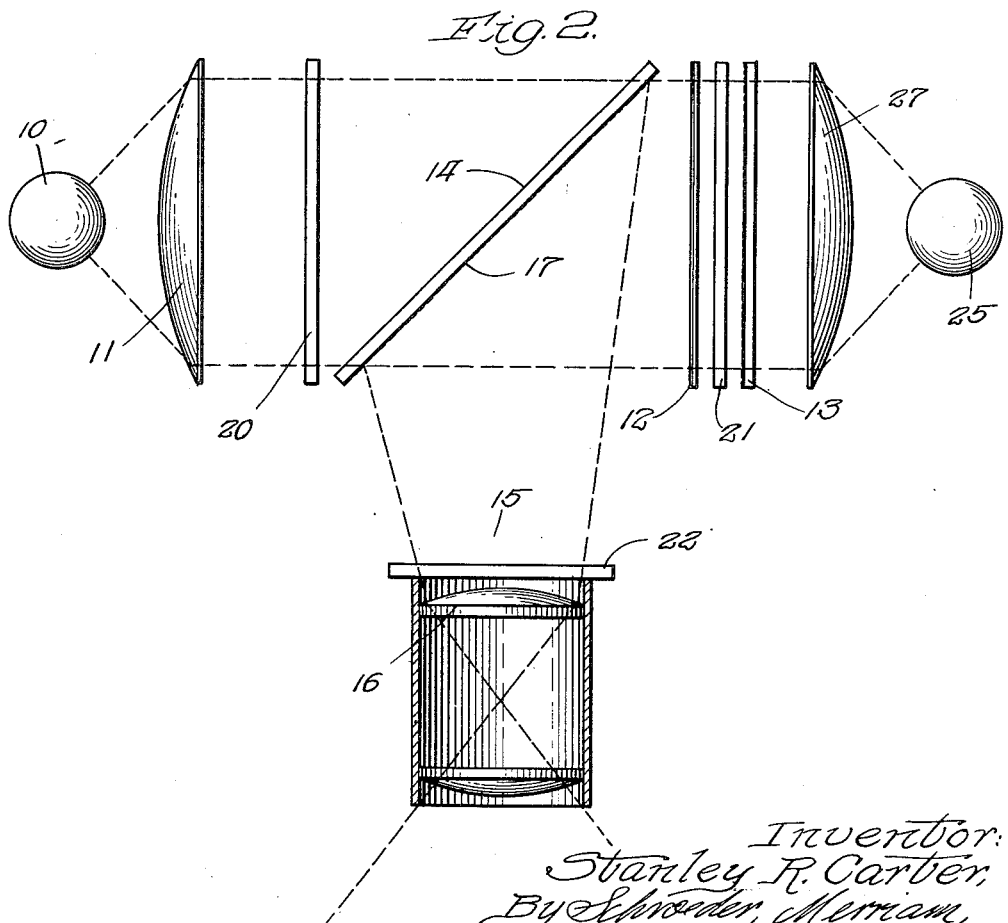

Other and further features of the invention will become readily apparent from the following disclosure and drawings in which:

Fig. 1 is a side elevation, schematic in character, showing the optical system of this invention; and Fig. 2 is a top plan of the apparatus shown in Fig. 1.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, I show a source of light which may take the form of a projection bulb 10. The light from the bulb is passed through a condensing lens 11 of usual construction so that the light emerging therefrom is substantially parallel light. The light emerging from the condensing lens 11 then passes through a transparency 12 suitably supported in the apparatus and is thence reflected back through the transparency by means of the plane mirror 13. Thus the light is passed through the transparency 12 twice. Positioned in the path of parallel light and located intermediate the condensing lens 11 and the transparency 12 is a second plane mirror 14 which is set at an angle of approximately 45° relative to the path of the light to reflect the light outwardly to a viewing area 15. At the viewing area a projection lens 16 may be provided to project the image of the transparency onto a screen or onto photosensitive paper if a print is to be made. If it is merely desired to examine the negative, the projection lens may be replaced by the human eye.

The diagonal mirror 14 is a transparent mirror, that is, the surface 17 of the mirror is provided with a reflective coating of silver, aluminum or other suitable material, which reflects approximately 80% of the light falling thereon, allowing 20% to pass therethrough without being reflected. Approximately 80% of the parallel light emerging from the condensing lens 11 is reflected outwardly out of the system while 20% passes through the mirror 14 and through the transparency 12 to be reflected back and through the transparency by the mirror 13.

Clearly, some of the light falling upon the face of the transparency 12 would be reflected directly therefrom and against the surface 17 of the diagonal mirror and out to the viewing area unless some means are provided for eliminating such reflections. Preferably, the transparency 12 is coated with a non-reflective fluoride coating which, as is well known, is quite effective in eliminating reflections. If the transparency is such that it cannot be so coated or should it be undesirable so to do, other means are provided for eliminating reflections from the face of the transparency 12.

To this end a first polarizing filter 20 is located in the path of the parallel rays of light emerging from the condensing lens 11 to polarize all light passing through the diagonal mirror and through the transparency 12. Between the transparency 12 and the plane mirror 13 a quarter wave plate 21 is provided which serves to rotate the plane of polarity of the polarizing light 90° as the light is passed through the plate in each direction. Although it might be expected that light passing through the quarter wave plate 21 would have its plane of polarity rotated partially as the light passes therethrough from left to right (as seen in Figs. 1 and 2) and then rotate in the reverse direction an equal amount as it again passes through the quarter wave plate 21 (and thus produce no rotation of the plane of polarity), I have discovered that the actual effect is quite contrary and the double passage of the light through the quarter wave plate 21 effects a rotation of the plane of polarity of the polarized light of 90°. Thus if the polarizing filter 20 is so mounted as to have its plane of polarity horizontal the plane of the polarity of the light emerging from the transparency 12 from right to left after passing twice through the quarter wave plate 21 is vertical.

A second polarizing filter 22 is located in the viewing area 15. This filter has its plane of polarity positioned 90° from the plane of polarity of the filter 20 and thus, in the example above cited, the plane of polarity of the filter 22 is vertically aligned. Any reflections from the front surface of the transparency 12 have, of course, the same polarity as the light falling thereon and thus are horizontally polarized in the examples cited. Light so polarized is filtered out by the filter 22 so that it does not enter the projection lens 16 or the eye of the observer.

The light source 10 is variable and suitable means in the form of a control, such as the rheostat 23, is provided for controlling the intensity of the light.

In some cases the increase in contrast afforded by the apparatus as described above is too great and therefore means are provided for modulating the degree of contrast. To this end a second source of light in the form of a projection bulb 25 is provided adjacent the right-hand portion (as seen in Figs. 1 and 2) of the optical system. The projection bulb 25 is controllable by means of a rheostat 26 and the like to control the intensity of light which passes through a second condensing lens 27 to refract the light rays into parallel beams of light, directed towards the back face of the transparency 12. To permit the light to pass through the mirror 13 it may be provided with a semi-transparent surface similar to the surface 17 to allow approximately 20% of the light to pass therethrough.

It is believed that the principles of my invention are clear from the foregoing description. Light from the source 10 is converted into parallel beams of light by the condensing lens 11, which beams pass through the diagonal mirror 14 and through the transparency 12. As the mirror 13 behind the transparency 12 is a plane mirror each ray or beam of light passing through the transparency 12 is reflected at an angle of approximately 180° and directed back through the transparency and passes again through the transparency through the same area as it traversed in its first passage. Thus light passing through an area of the transparency 12 having little or no opacity is diminished only a slight degree, while light passing through a denser area of the transparency is diminished to a far greater degree because of the fact that the passage through such area is made twice. This double passage of light through the transparency greatly increases the apparent contrast thereof and as pointed out above may in some cases increase the transparency more than is desired. To reduce or modulate the degree of contrast the light source 25 is provided, the light from which passes through the transparency but once and thus should the contrast be too great when using the source 10 the degree of contrast may be reduced by using the light source 25 and increasing or decreasing its brilliance until the desired degree of contrast has been achieved.

If found desirable, the rheostats may be connected to work together so that by manipulating one of the rheostats, for example the rheostat 23, to decrease the intensity of the bulb 10 the intensity of the bulb 25 is simultaneously increased. To this end means may be provided connecting the rheostats together, for example a chain 28 which is mounted on a sprocket carried by each rheostat. Thus the manual operation of one of the rheostats automatically operates the other.

I claim:

1. The method for increasing contrast in a transparency which includes the steps of passing light through the transparency, reflecting the light passing through the transparency in the reverse direction with each ray of light passing twice through the same area of the transparency, passing additional light through the transparency only in said reverse direction and then directing at least a portion of all the light passing through the transparency in said reverse direction to a viewing area.

2. The method for increasing contrast in a transparency which comprises passing parallel light through the transparency, reflecting the light from a plane surface through the transparency in the reverse direction whereby each ray of light passes twice through the same area of the transparency, passing additional parallel light through said transparency only in said reverse direction and then directing at least a portion of all of the light passing through said transparency in said reverse direction to a viewing area.

3. Apparatus for increasing the contrast of a transparency which comprises a source of parallel light, means for supporting a transparency in the path of said light, a transparent mirror in said path intermediate the source and the transparency and having a reflecting surface lying in a plane intersecting the path of said light at an angle of approximately 45°, a second transparent mirror positioned adjacent the side of the transparency opposite to said source and having a reflecting surface lying in a plane intersecting the path of said light at an angle of approximately 90° whereby the rays of light from said source are passed twice through the same area of the transparency a second source of parallel light positioned on the side of the transparency opposite the first source whereby the rays of light from said second source are passed once through the transparency and are then reflected together with the reflected light from the first source at an angle of approximately 90° to a viewing area.

4. The apparatus of claim 3 including a first polarizing filter positioned adjacent said first source for polarizing the light therefrom, a quarter wave plate positioned intermediate the transparency and the second transparent mirror, and a second polarizing filter positioned intermediate the transparent mirror and the viewing area, said second filter having its polarity offset 90° from the polarity of the first filter.

5. The apparatus of claim 4 including means for varying the intensity of light from each of said sources to moderate the degree of contrast.

6. Apparatus for increasing the contrast of a transparency which comprises a first source of light, means for supporting a transparency in the path of said light, a transparent mirror positioned adjacent the side of the transparency opposite to said source whereby to reflect the rays of light from said source passing through the transparency and back through the transparency in the reverse direction, a second source of light positioned on said opposite side of said transparency whereby the light from said second source passes through said transparent mirror and said transparency only in said reverse direction, means for directing at least a part of all of the light passing through said transparency in said reverse direction to a viewing area, and means for varying the intensity of at least one of said light sources.

STANLEY R. CARTER.

References Cited in the file of this patent

UNITED STATES PATENTS

| Number | Name | Date |
|---|---|---|
| 1,740,673 | Whitaker et al. | Dec. 24, 1929 |
| 2,014,688 | Mabboux | Sept. 17, 1935 |
| 2,131,501 | Dimmick | Sept. 27, 1938 |
| 2,158,129 | Land | May 16, 1939 |
| 2,318,705 | Morgan | May 11, 1943 |
| 2,501,446 | Justice | Mar. 21, 1950 |